United States Patent
Dergham et al.

(10) Patent No.: US 11,485,089 B2
(45) Date of Patent: Nov. 1, 2022

(54) METHOD AND SYSTEM FOR OPERATING A MODULAR HEATER TO IMPROVE LAYER BONDING IN A METAL DROP EJECTING THREE-DIMENSIONAL (3D) OBJECT PRINTER

(71) Applicant: Xerox Corporation, Norwalk, CT (US)

(72) Inventors: Ali R. Dergham, Fairport, NY (US); Douglas K. Herrmann, Webster, NY (US); Christopher D. Atwood, Webster, NY (US); Erwin Ruiz, Rochester, NY (US); Derek A. Bryl, Webster, NY (US); Linn C. Hoover, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 343 days.

(21) Appl. No.: 16/816,853

(22) Filed: Mar. 12, 2020

(65) Prior Publication Data
US 2021/0283853 A1 Sep. 16, 2021

(51) Int. Cl.
*B29C 64/393* (2017.01)
*B29C 64/112* (2017.01)
(Continued)

(52) U.S. Cl.
CPC .......... *B29C 64/393* (2017.08); *B29C 64/112* (2017.08); *B29C 64/232* (2017.08);
(Continued)

(58) Field of Classification Search
CPC .................................................. B29C 64/393
See application file for complete search history.

(56) References Cited

U.S. PATENT DOCUMENTS

2004/0003738 A1 1/2004 Imiolek et al.
2015/0097307 A1* 4/2015 Batchelder ............ B29C 64/118
264/129
(Continued)

FOREIGN PATENT DOCUMENTS

CN 104416159 B 6/2016
EP 3 459 673 A1 3/2019
(Continued)

OTHER PUBLICATIONS

European Patent Office, Extended European Search Report corresponding to European Patent Application No. 21 15 9105 (9 pages), dated Jul. 28, 2021, Munich Germany.

*Primary Examiner* — Suresh Suryawanshi
(74) *Attorney, Agent, or Firm* — Maginot Moore & Beck LLP (57) ABSTRACT

A method operates a three-dimensional (3D) metal object manufacturing system to maintain a temperature of an uppermost layer of a 3D metal object being formed within a temperature range conducive for bonding between the uppermost layer and a next layer to be formed. A controller of the system compares a temperature of the uppermost layer with at least a low end temperature of the temperature range and operates an electrical resistance switching network using 3D model data to provide electrical power selectively to heating elements in a modular heater to heat the 3D metal object being formed when the temperature indicated by the signal from the sensor is less than the predetermined temperature.

20 Claims, 10 Drawing Sheets

(51) Int. Cl.
*B29C 64/232* (2017.01)
*B29C 64/245* (2017.01)
*B29C 64/295* (2017.01)
*B29C 64/241* (2017.01)
*B33Y 10/00* (2015.01)
*B33Y 30/00* (2015.01)
*B33Y 50/02* (2015.01)

(52) U.S. Cl.
CPC .......... *B29C 64/241* (2017.08); *B29C 64/245* (2017.08); *B29C 64/295* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2015/0190968 A1* | 7/2015 | Griszbacher | B33Y 50/02 264/40.6 |
| 2015/0314528 A1 | 11/2015 | Gordon | |
| 2019/0047226 A1* | 2/2019 | Ishikawa | B22F 10/20 |
| 2020/0384689 A1* | 12/2020 | Bautista Ballester | B29C 64/165 |
| 2021/0108856 A1* | 4/2021 | Fontana | B22F 3/1021 |

FOREIGN PATENT DOCUMENTS

| | | | |
|---|---|---|---|
| WO | 2017/194122 A1 | 11/2017 | |
| WO | 2019/032687 A1 | 2/2019 | |

\* cited by examiner

METHOD AND SYSTEM FOR OPERATING A MODULAR HEATER TO IMPROVE LAYER BONDING IN A METAL DROP EJECTING THREE-DIMENSIONAL (3D) OBJECT PRINTER

TECHNICAL FIELD

This disclosure is directed to liquid metal ejectors used in three-dimensional (3D) object printers and, more particularly, to use of a modular heater to improve bonding between layers formed by the ejectors.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject thermoplastic materials that are melted materials, such as ABS plastic. The printer typically operates one or more ejectors to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of liquid metal from one or more ejectors to form 3D objects. These printers have a source of solid metal, such as a roll of wire or pellets, that are fed into a heating chamber where they are melted and the liquid metal flows into a chamber of the ejector. The chamber is made of non-conductive material around which an uninsulated electrical wire is wrapped. An electrical current is passed through the conductor to produce an electromagnetic field that causes the meniscus of the liquid metal at a nozzle of the chamber to separate from the liquid metal within the chamber and be propelled from the nozzle. A platform opposite the nozzle of the ejector is moved in a X-Y plane parallel to the plane of the platform by a controller operating actuators to form layers of an object on the platform and another actuator is operated by the controller to alter the position of the ejector or platform in the vertical or Z direction to maintain a constant distance between the ejector and an uppermost layer of the object being formed.

In current metal drop ejecting systems, the base plate on which the metal object is formed is heated to a temperature of about 400° C. to keep the metal object layers at a temperature useful for a newly applied layer to bond to the previously formed metal layers. Testing has shown that to fuse the molten aluminum drops of a new layer to the previously formed layer requires that the temperature of the receiving surface needs to be in the range of about 400° C. to about 550° C. As the metal object continues to increase in height above the base plate, the heating of the base plate is unable to maintain the temperature of the uppermost layer of the object within the required range for ensuring a good bond between the ejected molten drops and the top surface of the object. If the base plate is heated to a temperature adequate to keep the top surface of the object within the required range for good bonding, the lower layers may reach a temperature that affects their structural integrity. A system that can maintain the uppermost layer at a temperature within a good range for layer-to-layer bonding without adversely impacting the structural integrity of the lower levels would be beneficial.

SUMMARY

A new method of operating a modular heater outside the base plate in a metal ejecting 3D object printer maintains the uppermost layer of the metal object at a temperature within a good range for layer-to-layer bonding without adversely impacting the structural integrity of the lower levels. The method includes generating with a sensor a signal indicating a temperature of a surface of a metal object being formed by the 3D metal object manufacturing system prior to completion of the metal object, comparing with a controller the temperature indicated by the signal from the sensor with a predetermined temperature, operating with the controller at least one actuator to move bidirectionally a modular heater having a plurality of independently controlled heating elements with respect to the metal object being formed, and providing electrical power selectively to the heating elements in the plurality of heating elements to heat the 3D metal object prior to formation of a next layer of the 3D metal object when the temperature indicated by the signal from the sensor is less than the predetermined temperature.

A new modular heater is configured to maintain an uppermost layer of a 3D metal object being formed at a temperature within a good range for layer-to-layer bonding without adversely impacting the structural integrity of the lower levels. The modular heater includes a sensor configured to generate a signal indicative of a temperature of a surface of a metal object being formed by the 3D metal object manufacturing system prior to completion of the metal object, a reciprocating arm, a plurality of heating elements configured for independent operation and arranged within a frame, the frame being mounted to one end of the reciprocating arm, at least one actuator operatively connected to the reciprocating arm, the at least one actuator being configured to at least move the reciprocating arm bidirectionally, an electrical resistance switching network operatively connected to the heating elements in the modular heater, and a controller operatively connected to the sensor, the at least one actuator, and the electrical resistance switching network. The controller is configured to (1) compare the temperature indicated by the signal from the sensor with a predetermined temperature, (2) operate the at least one actuator to move the plurality of heating elements bidirectionally, and (3) operate the electrical resistance switching network to couple electrical power selectively to the heating elements in the plurality of heating elements to heat the 3D metal object prior to formation of a next layer of the 3D metal object when the temperature indicated by the signal from the sensor is less than the predetermined temperature.

BRIEF DESCRIPTION OF THE DRAWINGS

The foregoing aspects and other features of operating a metal ejecting 3D object printer to maintain the uppermost layer at a temperature within a good range for layer-to-layer bonding without adversely impacting the structural integrity of the lower levels are explained in the following description, taken in connection with the accompanying drawings.

DETAILED DESCRIPTION

For a general understanding of the environment for the device disclosed herein as well as the details for the device, reference is made to the drawings. In the drawings, like reference numerals designate like elements.

Figure 1:
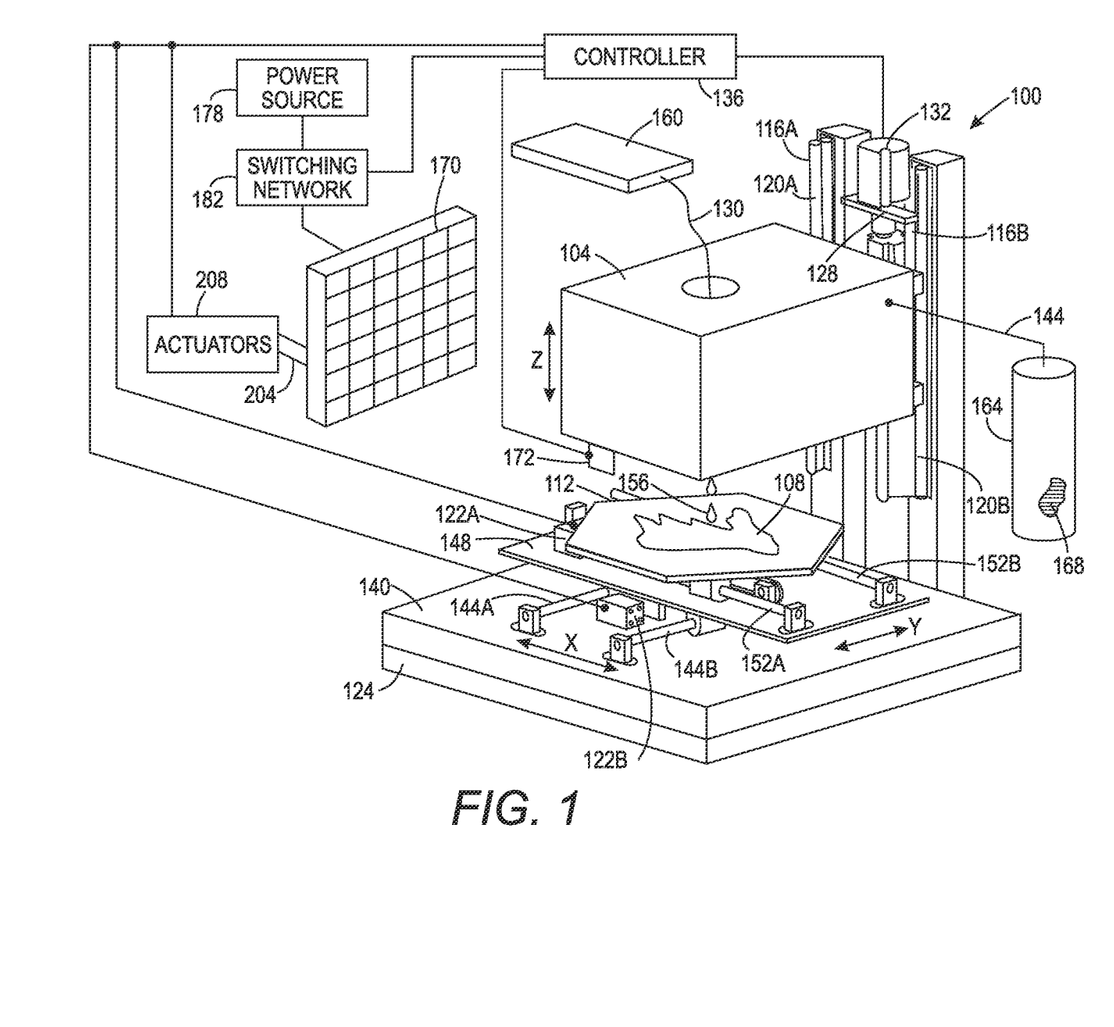
FIG. 1 depicts a 3D metal object printer having a modular heater that operates to maintain the uppermost layer at a temperature within a good range for layer-to-layer bonding without adversely impacting the structural integrity of the lower levels.

FIG. 1 illustrates an embodiment of a liquid metal 3D object printer 100 that operates a modular heater 170 to aid in the bonding of layers during manufacture of an object. In this embodiment, drops of liquid metal are ejected from a printhead 104 and these drops form a three-dimensional metal object 108 on a platform 112. A source of metal 160 feeds metal in a form, such as metal wire 130, that is melted within printhead 104 to provide liquid metal for a chamber within the printhead. An inert gas supply 164 provides a pressure regulated source of an inert gas 168, such as argon, to the melted metal in the printhead 104 through a gas supply tube 144 to prevent the formation of aluminum oxide in the printhead.

The printhead 104 is movably mounted within Z-axis tracks 116A and 116B in a pair of vertically oriented members 120A and 120B, respectively. Members 120A and 120B are connected at one end to one side of a frame 124 and at another end to one another by a horizontal member 128. An actuator 132 is mounted to the horizontal member 128 and operatively connected to the printhead 104 to move the printhead along the Z-axis tracks 116A and 166B. The actuator 132 is operated by a controller 136 to maintain a predetermined distance between one or more nozzles (not shown in FIG. 1) of the printhead 104 and an uppermost surface of the object 108 on the platform 112. A non-contact temperature sensor 172 is operatively connected to the controller 136. The non-contact temperature sensor 172 is configured to generate a signal indicative of the temperature of the uppermost layer of the object 108.

Mounted to the frame 124 is a planar member 140, which can be formed of granite or other sturdy material to provide reliably solid support for movement of the platform 112. Platform 112 is affixed to X-axis tracks 144A and 144B so the platform 112 can move bidirectionally along an X-axis as shown in the figure. The X-axis tracks 144A and 144B are affixed to a stage 148 and stage 148 is affixed to Y-axis tracks 152A and 152B so the stage 148 can move bidirectionally along a Y-axis as shown in the figure. Actuator 122A is operatively connected to the platform 112 and actuator 122B is operatively connected to the stage 148. Controller 136 operates the actuators 122A and 122B to move the platform along the X-axis and to move the stage 148 along the Y-axis to move the platform in an X-Y plane that is opposite the printhead 104. Performing this X-Y planar movement of platform 112 as drops of molten metal 156 are ejected toward the platform 112 forms a layer of the three-dimensional object 108. Controller 136 also operates actuator 132 to adjust the vertical distance between the printhead 104 and the most recently formed layer to enable formation of a next object layer. While the liquid metal 3D object printer 100 is depicted in FIG. 1 as being operated in a vertical orientation, other alternative orientations can be employed. Also, while the embodiment shown in FIG. 1 has a platform that moves in an X-Y plane and the printhead moves along the Z axis, other arrangements are possible. For example, the printhead 104 can be configured for movement in the X-Y plane and along the Z axis. Additionally, while the printhead 104 has only one nozzle, it is configured in other embodiments with multiple nozzles.

The controller 136 can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During object formation, image data for an image to be produced are sent to the processor or processors for controller 136 from either a scanning system or an online or work station connection for processing and generation of the printhead control signals output to the printhead 104.

The controller 136 of the liquid metal 3D object printer 100 requires data from external sources to control the printer for object formation. In general, a three-dimensional model or other digital data model of the object to be formed is stored in a memory operatively connected to the controller 136, the controller can access through a server or the like a remote database in which the digital data model is stored, or a computer-readable medium in which the digital data model is stored can be selectively coupled to the controller 136 for access. The three-dimensional model or other digital data model can be used by the controller to generate machine-ready instructions for execution by the controller 136 to operate the components of the printer 100 and fabricate the object corresponding to the model. The generation of the machine-ready instructions can include the production of intermediate models, such as when a CAD model of the object is converted into an STL data model, or other polygonal mesh or other intermediate representation, which can in turn be processed to generate machine instructions, such as g-code for fabrication of the object by the printer. As used in this document, the term "machine-ready instructions" means computer language commands that are executed by a computer, microprocessor, or controller to operate components of a 3D metal object additive manufacturing system to form a metal object. The controller 136 executes the machine-ready instructions to control the ejection of the metal drops from the printhead 104, the positioning of stage 148 and the platform 112, as well as the distance between the printhead 102 and the uppermost layer of the object.

Figure 2:
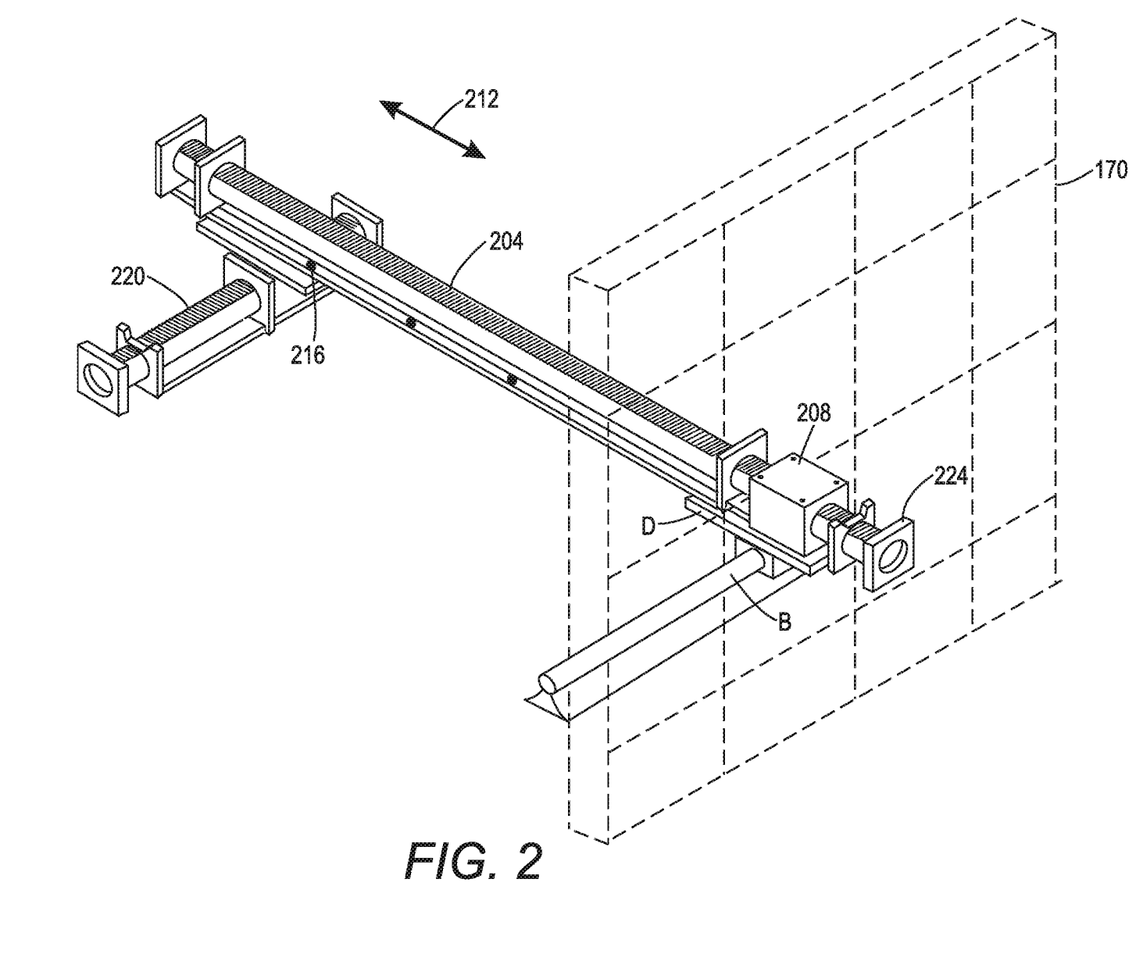
FIG. 2 is a perspective view of a modular heater attached to a reciprocating arm for control of a distance between the modular heater and an object being formed by the 3D metal object printer of FIG. 1.
Figure 3A:
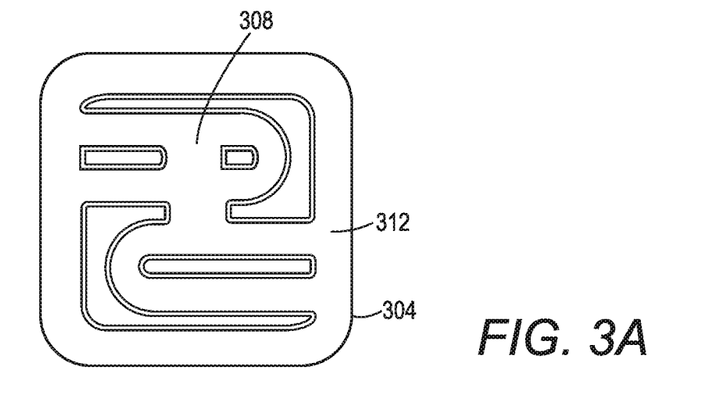
FIG. 3A is a bottom view of a curved surface of a heating element in the modular heater of FIG. 2.
Figure 3B:
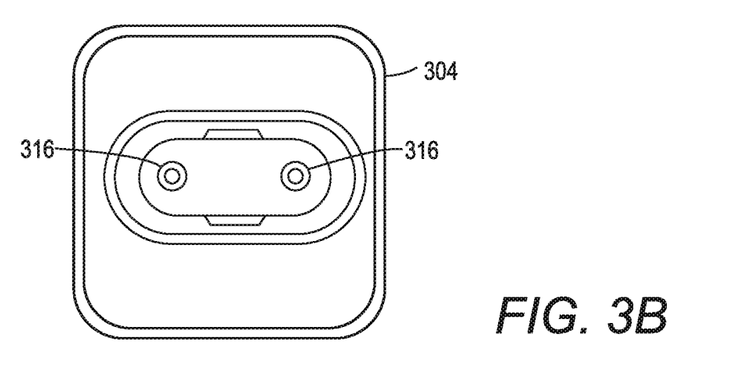
FIG. 3B is a top view of a heating element in the modular heater of FIG. 2.
Figure 3C:
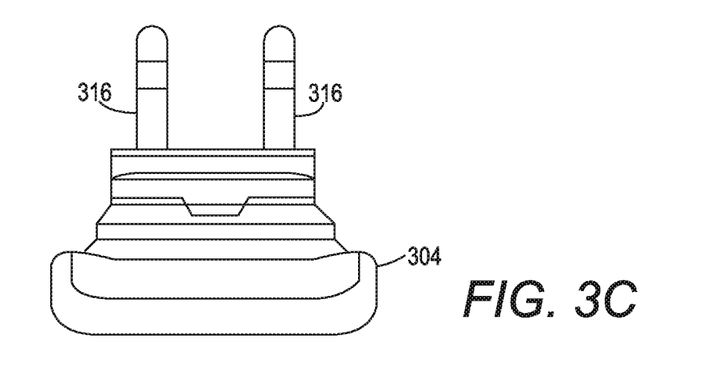
FIG. 3C is a side view of a heating element in the modular heater of FIG. 2.
Figure 3D:
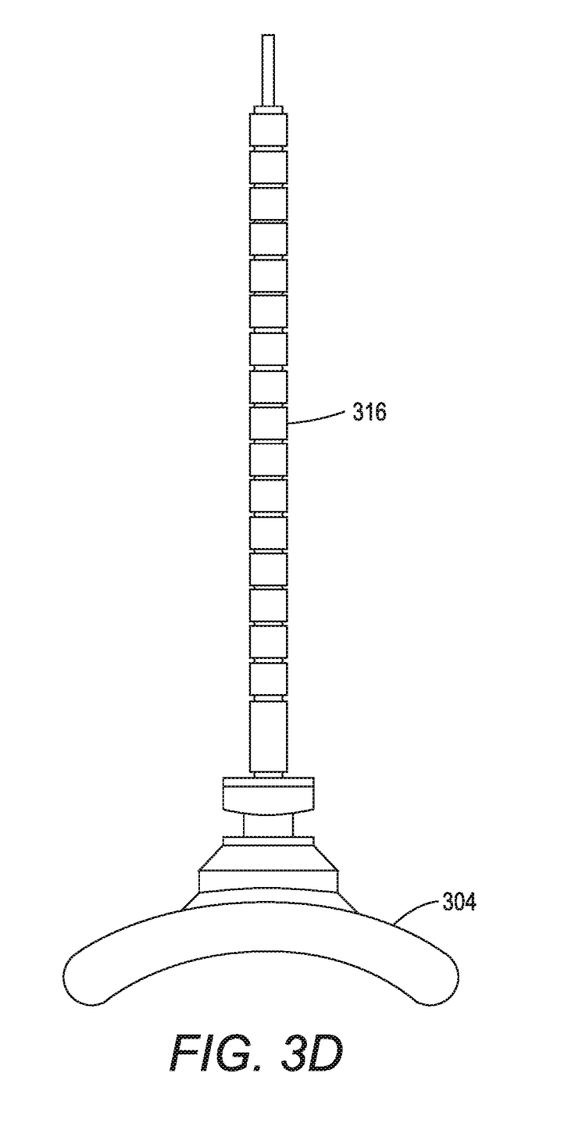
FIG. 3D is another side view of a heating element in the modular heater of FIG. 2 rotated by ninety degrees from the view shown in FIG. 3C.

The platform 112 is heated by one or more heating elements (not shown) to keep the platform at a temperature of about 400° C. as explained above. Additionally, a modular heater 170, which is described in more detail below, is operated by the controller 136 to maintain the uppermost surface of the object 108 within the temperature range of about 400° C. to about 550° C. once the height of the object 108 exceeds a distance where the heater of the platform is unable to maintain the uppermost surface at the lower limit of that range. As shown in FIG. 2, the modular heater 170 is shown in phantom outline as being mounted to one end of a reciprocating member 204. An actuator 208 is operatively connected to the controller 136. The actuator 208 is operated by the controller 136 to extend and retract the member in the directions indicated by the double-headed arrow 212. This operation moves the modular heater toward and away from the object being formed on the platform 112 to vary the intensity of the heat generated by the modular heater as a function of the distance between the modular heater and the object. Another actuator 216 is configured to move another reciprocating arm 220 toward and away from the reciprocating member 204. Operating this actuator with the controller 136 moves the modular heater horizontally with respect to the object on the platform 112. Also, the fixture 224 for mounting the frame (FIG. 4) in which the modular heater 170 is arranged to the reciprocating arm 204 is provided with an actuator operatively connected to the controller 136. This actuator rotates the modular heater in a yaw (side-to-side) motion and a pitch (up-and-down) motion to change the angular orientation of the modular heater 170 with respect to the object 108. In one embodiment, the center of the frame is mounted to the end of the reciprocating arm 204. As used in this document, "yaw" means angular rotation within a plane formed by a longitudinal axis of the reciprocating arm and a horizontal axis perpendicular to the longitudinal axis and "pitch" means angular rotation within a plane formed by the longitudinal axis of the reciprocating arm and a vertical axis perpendicular to the longitudinal axis The modular heater 170 is comprised of a plurality of heating elements, such as the heating element 304 shown in FIGS. 3A, 3B, 3C, and 3D. The bottom surface of the element 304 shown in FIG. 3A has an electrical resistive trace 308 that is formed or mounted on an electrical insulative material 312. The electrical resistive trace 308 is electrically connected to the conductive probes 316 that extend out of the page as shown in the top view of the heating element 304 depicted in FIG. 3B. The conductive probes for each of the heating elements in a modular heater are operatively connected to an electrical power source 178 through an electrical resistance switching network 182 as shown in FIG. 1. The controller 136 is operatively connected to the electrical resistance switching network 182 to operate the switches and vary the resistances connected to the switches in the network 182 that connect the heating elements 304 in the modular heater 170 to the electrical power source 178 selectively and independently of one another. By independently varying the electrical resistances connected to the heating elements through the switches in the network 182, the heating elements can be operated with different levels of electrical power so the intensity of the infrared (IR) heat generated by the different heating elements in the modular heater can vary. FIG. 3C is a side view of the heating element 304 and FIG. 3D is a side view of the heating element rotated ninety degrees from the view shown in FIG. 3C so the two probes are aligned with one another from the viewer's perspective. The view depicted in FIG. 3D reveals that the surface of the heating element 304 is curved. This curvature focuses the heat generated by the heating element. A heating element like the one shown in FIG. 3A through FIG. 3D is available from Ceramicx Ltd. of Gortnagrough, Ballydehob, County Cork, P81 H026, Ireland and is known as a Quarter Curved Trough Element.

Figure 4:
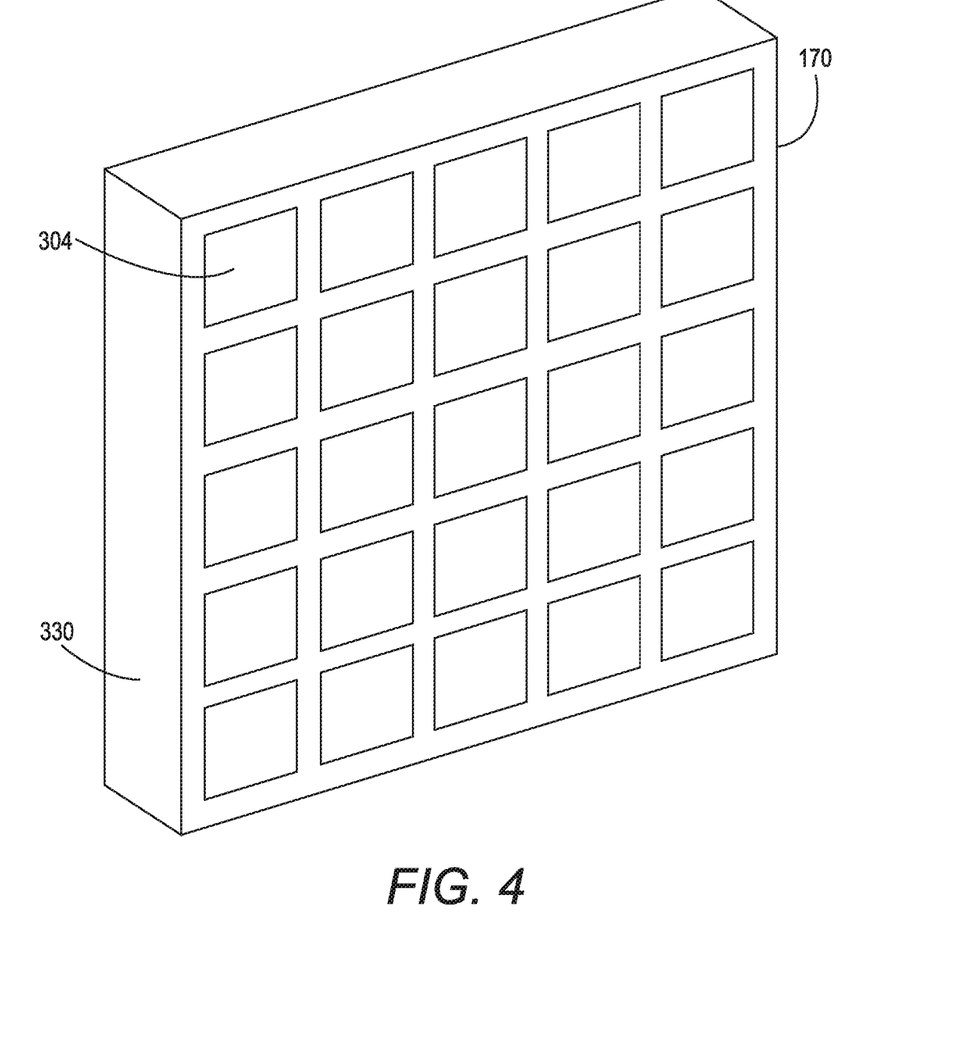
FIG. 4 is a perspective view of the modular heater comprised of a plurality of heating elements shown in FIG. 3A through FIG. 3D.

An embodiment of a modular heater 170 is shown in FIG. 4. This embodiment is an array of heating elements 304, such as the one shown in FIG. 3A through 3D, mounted within a frame 330. The heating elements 304 are arranged in a rectangular array of columns and rows, although other arrangements of the heating elements can be used including non-rectangular array arrangements. As used in this document, the term "modular heater" means an arrangement of heating elements within a frame so the heating elements can be moved and angularly oriented as a unit.

Figure 5A:
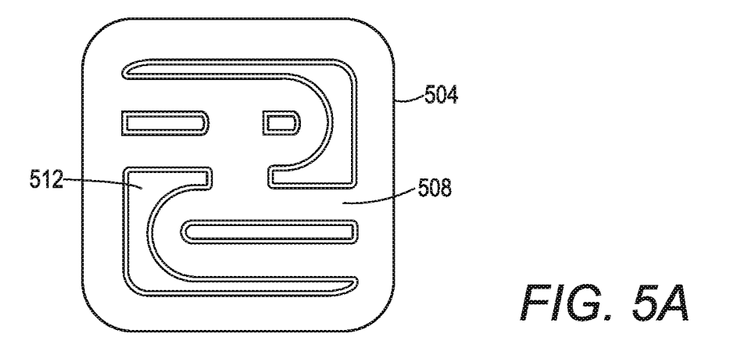
FIG. 5A is a bottom view of a flat surface of a heating element in the modular heater of FIG. 2.
Figure 5B:
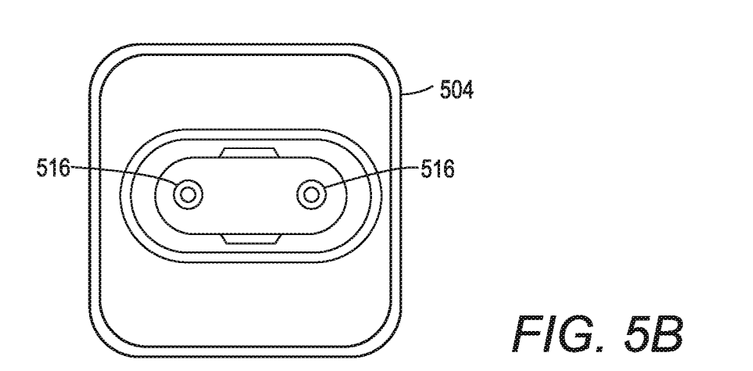
FIG. 5B is a top view of a heating element in the modular heater of FIG. 2.
Figure 5C:
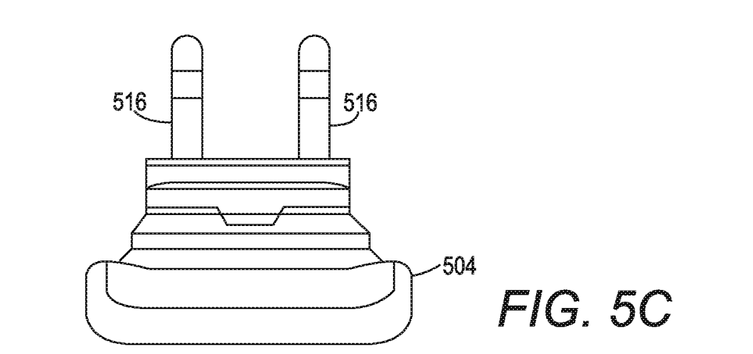
FIG. 5C is a side view of a heating element in the modular heater of FIG. 2.
Figure 5D:
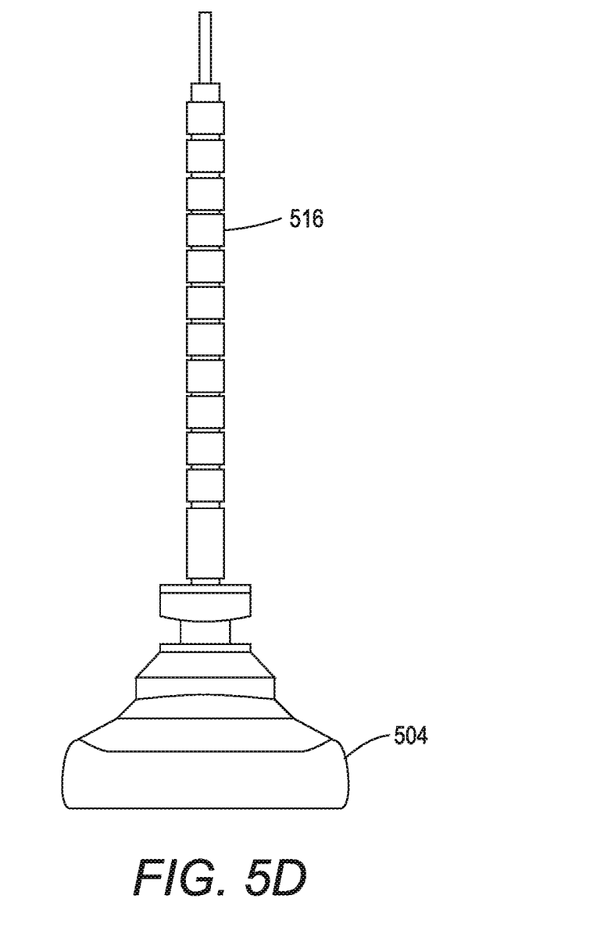
FIG. 5D is another side view of a heating element in the modular heater of FIG. 2 rotated by ninety degrees from the view shown in FIG. 5C.

Another heating element 504 that can be used in modular heater 170 is shown in FIG. 5A through 5D. The bottom surface of the element 504 shown in FIG. 5A has an electrical resistive trace 508 that is formed or mounted on an electrical insulative material 512. The electrical resistive trace 508 is electrically connected to the conductive probes 516 that extend out of the page as shown in the top view of the heating element 504 depicted in FIG. 5B. The conductive probes for each of the heating elements in a modular heater are operatively connected to an electrical power source 178 through an electrical resistance switching network 182 as shown in FIG. 1. The controller 136 is operatively connected to the electrical resistance switching network 182 to operate the switches and vary the resistances connected to the switches in the network 182 that connect the heating elements 504 in the modular heater 170 to the electrical power source 178 selectively and independently of one another. By independently varying the electrical resistances connected to the heating elements through the switches in the network 182, the heating elements can be operated with different levels of electrical power so the intensity of the infrared (IR) heat generated by the different heating elements in the modular heater can vary. FIG. 5C is a side view of the heating element 504 and FIG. 5D is a side view of the heating element rotated ninety degrees from the view shown in FIG. 5C so the two probes are aligned with one another from the viewer's perspective. The view depicted in FIG. 5D reveals that the surface of the heating element 504 is flat. This flat surface broadens the heat field generated by the heating element more than the heat field generated by the heating element 304. A heating element like the one shown in FIG. 5A through FIG. 5D is available from Ceramicx Ltd.

of Gortnagrough, Ballydehob, County Cork, P81 H026, Ireland and is known as a Quarter Flat Element Hollow.

Figure 6A:
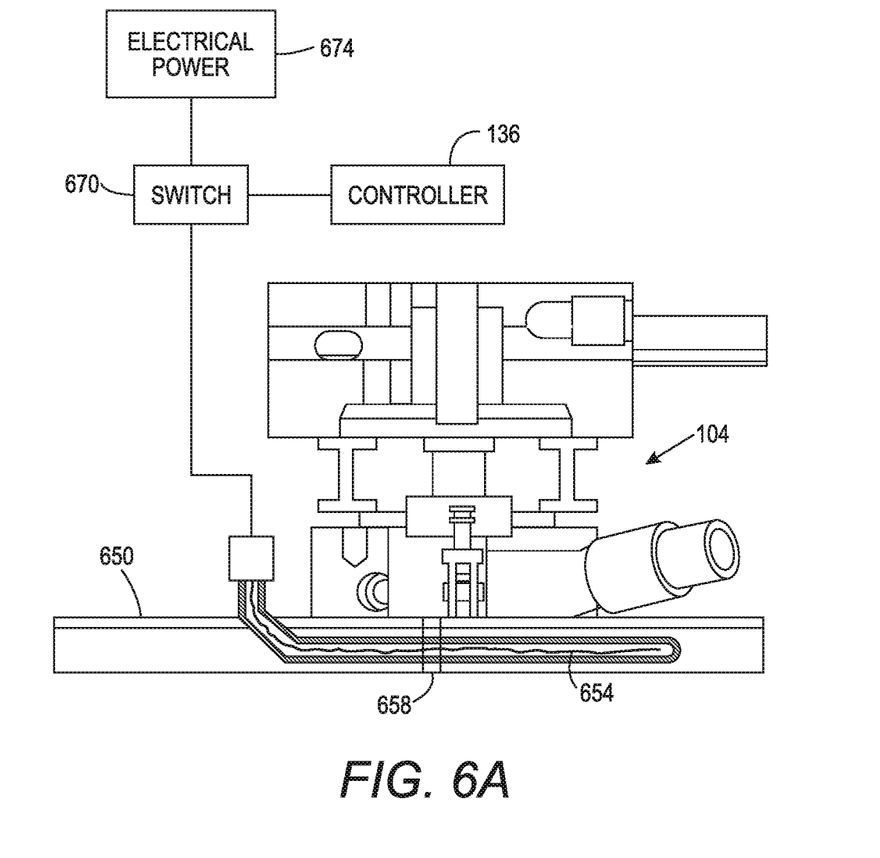
FIG. 6A is a side view of a plate surrounding the liquid metal ejector in which a modular heater is integrated.
Figure 6B:
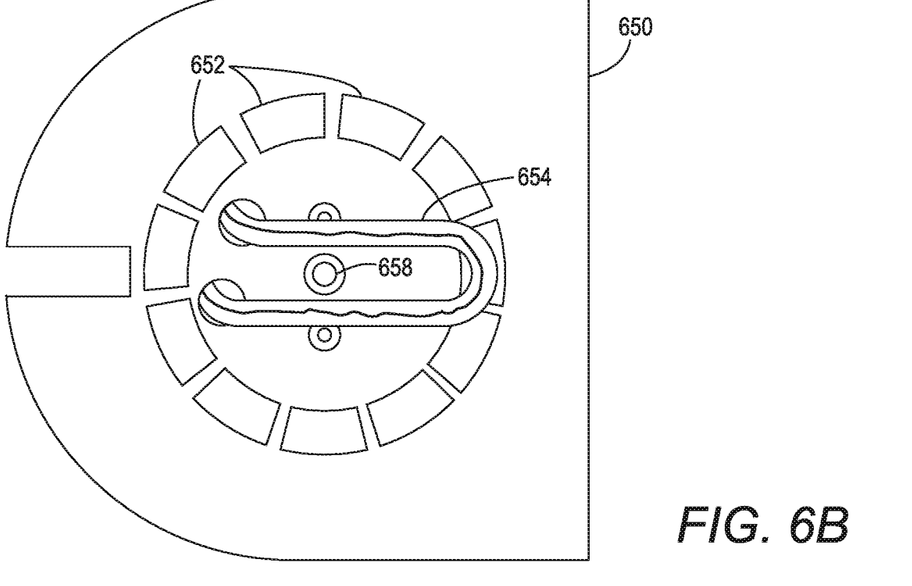
FIG. 6B is a bottom view of the plate of FIG. 6B

Another embodiment of a heater that can be used with the metal printing system of FIG. 1 is shown in FIG. 6A and FIG. 6B. The printhead 104 is integrated within a plate 650 so the ejector 658 of the printhead 104 extends through the plate and the ejector ejects metal drops onto the platform 112 (FIG. 1). Actuator 132 (FIG. 1) is operatively connected to the plate 650 and is operated by the controller 136 to move the plate with respect to the object being formed on the platform 112. A single heating element 654 can be configured in a shape about the ejector 658, which is U-shaped in FIG. 6B. A switch 670 is operated selectively by the controller 136 to connect the heating element 654 to an electrical power source 674 to activate the heating element and heat the upper surface of the object being formed by the metal drops ejected from ejector 658. In the bottom view of this configuration shown in FIG. 6B, an alternative version of the heater is shown. In that alternative embodiment, individual heating elements, such as those described above, are integrated in the plate 650 and each of these heating elements is connected to the electrical power source 674 through a switch 670. Again, the controller 136 operates these switches to connect the heating elements 662 to the electrical source 674 to alter the pattern of heat applied to the upper surface of the object. That is, all of the heating elements can be activated at once or certain ones can be activated. This independent operation of the heating elements enables selective operation of the elements.

Figure 6C:
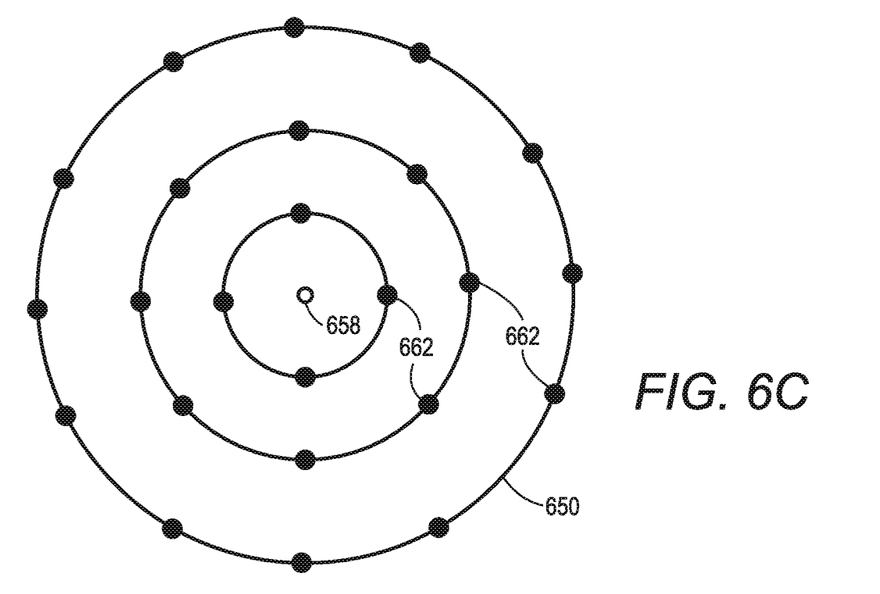
FIG. 6C is an alternative embodiment of the heating element array shown in FIG. 6B.

FIG. 6C shown an alternative embodiment of the circular configuration of heating elements 662 in the plate 650. In this embodiment, three concentric rings of heating elements 662 are positioned about the ejector 658. In the first ring, the heating elements are 90° apart, in the second ring, the heating elements are 45° apart, and in the third ring, the heating elements are 30° apart. This configuration enables a more varied heating pattern than the single ring configuration shown in FIG. 6B.

Figure 7:
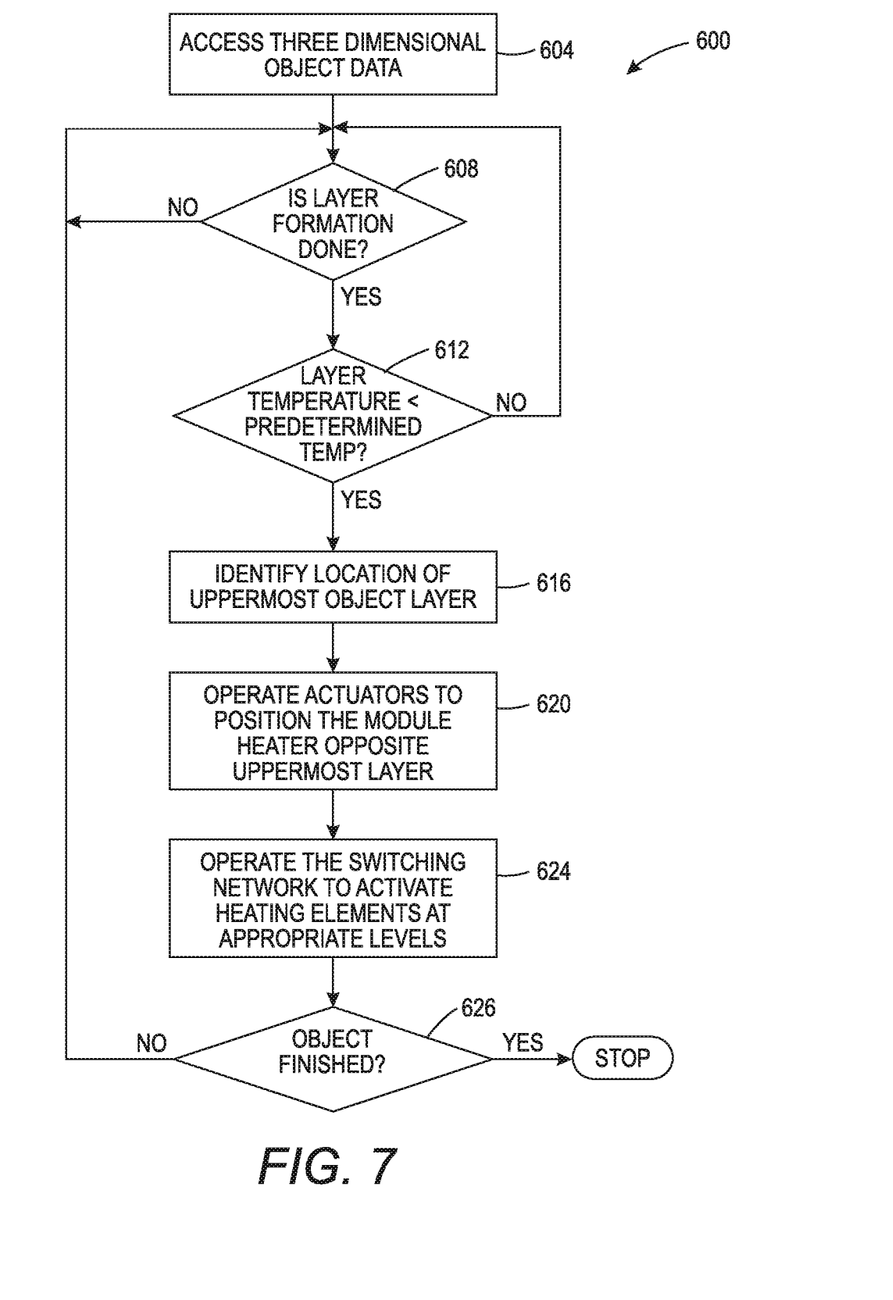
FIG. 7 is a flow diagram of a process for operating the modular heater of FIG. 1 and FIG. 2.

A process for operating the printer having the modular heater is shown in FIG. 7. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 136 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 7 is a flow diagram of a process 600 that operates the 3D metal object manufacturing system 100, which is sometimes called a printer, to maintain an uppermost layer of a 3D metal object being formed by the printer within a predetermined range of temperatures that promotes layer bonding without adversely impacting the structural integrity of previously formed layers. The process begins with the controller of the modular heater accessing the three-dimensional model data used to operate the printhead of the manufacturing system 100 to form the object (block 604). As used in this document, the term "three-dimensional model data" means the horizontal slices or the NC programming instructions produced by a 3D slicer for manufacture of a 3D object. After each layer is formed (block 608), the signal from the temperature sensor is compared to a predetermined temperature (block 612). If the temperature indicated by the sensor signal is equal to or greater than the predetermined temperature, then the process continues to check the temperature of the uppermost layer after each next layer is formed (block 608 and 612). If the temperature is less the predetermined temperature, then the process uses the data for forming the object to determine the location of the current uppermost layer (block 616). The controller operates the actuators that move the modular heater to position the heater appropriately with respect to the geometry of the partially formed object (block 620) and to operate the switching network to activate at least some of the heating elements in the modular heater using an appropriate resistance in the network to produce an adequate amount of heat to raise the temperature of the uppermost layer before the next layer is formed (block 624). The process of checking the temperature of the uppermost layer, positioning the modular heater, and selectively operating the heating elements at appropriate intensities (blocks 608 through 624) continues until formation of the object is completed (block 628). Once the object is completely formed, the process is terminated (block 630). This process can be expanded to also compare the temperature of the uppermost surface to a predetermined temperature corresponding to a high end of the temperature range effective for promoting the bonding of the uppermost layer of the 3D metal object with the next layer of the object to be formed. If the layer temperature exceeds this upper end of the range temperature, then the connection and resistances to the heating elements can be adjusted using the 3D model data to bring the temperature of the object layers within the desired temperature range.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for operating a three-dimensional (3D) metal object manufacturing system comprising:
generating with a sensor a signal indicating a temperature of a surface of a metal object being formed by the 3D metal object manufacturing system prior to completion of the metal object;
comparing with a controller the temperature indicated by the signal from the sensor with a predetermined temperature;
operating with the controller at least one actuator to change an angular orientation of a frame mounted to an end of a reciprocating arm having a longitudinal axis with respect to the metal object, a plurality of independently controlled heating elements being arranged within the frame; and
providing electrical power selectively to the heating elements in the plurality of heating elements to heat the 3D metal object prior to formation of a next layer of the 3D metal object when the temperature indicated by the signal from the sensor is less than the predetermined temperature.

2. The method of claim 1 further comprising:
operating the at least one actuator with the controller to move the frame closer to the 3D metal object being formed when the temperature indicated by the signal from the sensor is less than the predetermined temperature.

3. The method of claim 2 further comprising:
operating the at least one actuator with the controller to chance the angular orientation of the frame with respect to the 3D metal object being formed when the temperature indicated by the signal from the sensor is greater than the predetermined temperature.

4. The method of claim 1 wherein the predetermined temperature is 400° C.

5. The method of claim 3, the operation of the at least one actuator further comprises:
operating the at least one actuator with the controller to change the angular orientation of the frame in a yaw direction.

6. The method of claim 3, the operation of the at least one actuator further comprises:
operating the at least one actuator with the controller to change the angular orientation of the frame in a pitch direction.

7. The method of claim 6, the operation of the at least one actuator further comprises:
operating the at least one actuator with the controller to change the angular orientation of the frame in a yaw direction.

8. The method of claim 7, the selective provision of electrical power to the heating elements further comprises:
operating with the controller an electrical resistance switching network to couple electrical power selectively to the heating elements in the plurality of heating elements selectively to heat the 3D metal object prior to formation of a next layer of the 3D metal object when the temperature indicated by the signal from the sensor is less than the predetermined temperature.

9. The method of claim 8, the operation of the electrical resistance switching network further comprises:
operating the electrical resistance switching network with the controller to vary an electrical resistance coupled to at least one switch in the electrical resistance switching network to change an intensity of heat produced by at least one heating element with respect to an intensity of heat produced by at least one other heating element.

10. The method of claim 9 further comprising:
comparing with the controller the temperature indicated by the signal from the sensor with another predetermined temperature, the other predetermined temperature being greater than the predetermined temperature; and
changing with the controller the electrical resistances coupled to less than all of the switches in the electrical resistance switching network using three-dimensional model data to reduce the electrical power to the heating elements connected to the electrical resistances changed by the controller when the temperature indicated by the signal generated by the sensor is greater than the other predetermined temperature.

11. A modular heater for a three-dimensional (3D) metal object manufacturing system comprising:
a sensor configured to generate a signal indicative of a temperature of a surface of a metal object being formed by the 3D metal object manufacturing system prior to completion of the metal object;
a reciprocating arm having a longitudinal axis;
a plurality of heating elements configured for independent operation and arranged within a frame, the frame being mounted to one end of the reciprocating arm;
at least one actuator operatively connected to the reciprocating arm, the at least one actuator being configured to at least change the angular orientation of the plurality of heating elements within the frame with respect to the metal object being formed;
an electrical resistance switching network operatively connected to the heating elements in the modular heater; and
a controller operatively connected to the sensor, the at least one actuator, and the electrical resistance switching network, the controller being configured to:
compare the temperature indicated by the signal from the sensor with a predetermined temperature;
operate the at least one actuator to change the angular orientation of the plurality of heating elements within the frame with respect to the metal object being formed; and
operate the electrical resistance switching network to couple electrical power selectively to the heating elements in the plurality of heating elements to heat the 3D metal object prior to formation of a next layer of the 3D metal object when the temperature indicated by the signal from the sensor is less than the predetermined temperature.

12. The modular heater of claim 11, the controller being further configured to:
operate the at least one actuator to move the frame closer to the 3D metal object being formed when the temperature indicated by the signal from the sensor is less than the predetermined temperature.

13. The modular heater of claim 12, the controller being further configured to:
operate the at least one actuator to move the frame further from the 3D metal object being formed when the temperature indicated by the signal from the sensor is greater than the predetermined temperature.

14. The modular heater of claim 11 wherein the predetermined temperature is 400° C.

15. The modular heater of claim 13, the controller being further configured to:
operate the at least one actuator to change the angular orientation of the frame in a yaw direction.

16. The modular heater of claim 13, the controller being further configured to:
operate the at least one actuator to change the angular orientation of the frame in a pitch direction.

17. The modular heater of claim 16, the controller being further configured to:
operate the at least one actuator to change the angular orientation of the frame in a yaw direction.

18. The modular heater of claim 17, the controller being further configured to:
operate the electrical resistance switching network to vary an electrical resistance coupled to at least one switch in the electrical resistance switching network to change an intensity of heat produced by at least one heating element with respect to an intensity of heat produced by at least one other heating element.

19. The modular heater of claim 18, the controller being further configured to:
compare the temperature indicated by the signal from the sensor with an other predetermined temperature, the other predetermined temperature being greater than the predetermined temperature; and
change the electrical resistances coupled to less than all of the switches in the electrical resistance switching network to reduce the electrical power to the heating elements connected to the electrical resistances changed by the controller when the temperature indicated by the signal generated by the sensor is greater than the other predetermined temperature.

20. The modular heater of claim 19, the controller being further configured to:
use three-dimensional model data to operate the electrical resistance switching network.

* * * * *